R. H. BEAUMONT.
YIELDING ACTUATING MECHANISM FOR SKIP HOIST CHUTES.
APPLICATION FILED MAY 19, 1921.

1,411,831.

Patented Apr. 4, 1922.

Inventor
Robert H Beaumont
by his Attorneys
Howson & Howson

UNITED STATES PATENT OFFICE.

ROBERT H. BEAUMONT, OF RADNOR, PENNSYLVANIA, ASSIGNOR TO R. H. BEAUMONT COMPANY, OF PHILADELPHIA, PENNSYLVANIA, A CORPORATION OF PENNSYLVANIA.

YIELDING ACTUATING MECHANISM FOR SKIP-HOIST CHUTES.

1,411,831. Specification of Letters Patent. Patented Apr. 4, 1922.

Application filed May 19, 1921. Serial No. 470,754.

*To all whom it may concern:*

Be it known that I, ROBERT H. BEAUMONT, a citizen of the United States, residing in Radnor, Delaware County, Pennsylvania, have invented certain Improvements in Yielding Actuating Mechanism for Skip-Hoist Chutes, of which the following is a specification.

My invention relates to certain improvements in skip hoists, in which the bucket, when it is lowered, moves a chute into position so as to automatically load the bucket with the material and, when the bucket is filled and elevated, it turns the chute on its pivot and stops the flow of material.

The object of my invention is to provide a yielding means through which the chute is moved into position when the bucket is lowered to receive a load.

Figure 2:
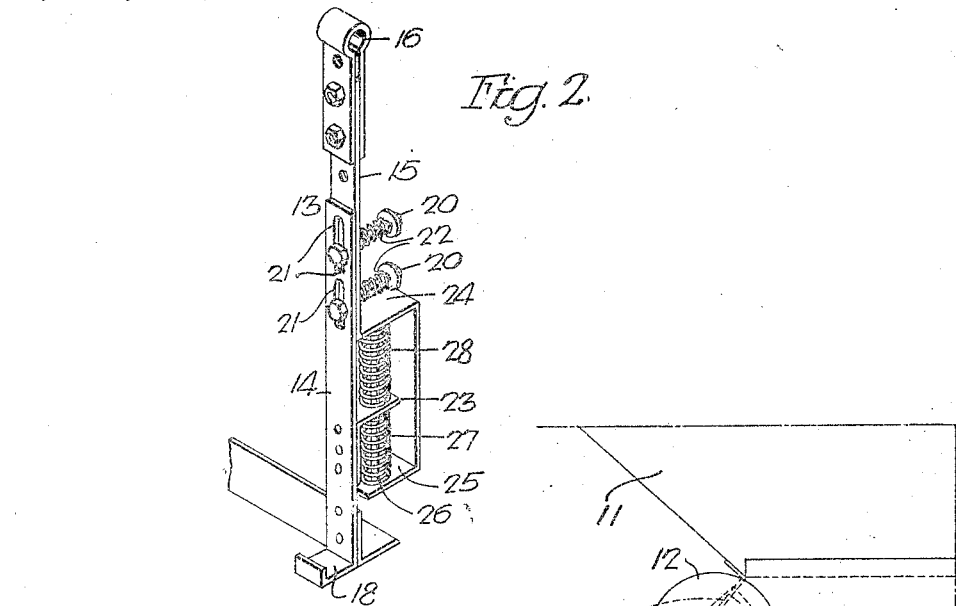
Figure 1:
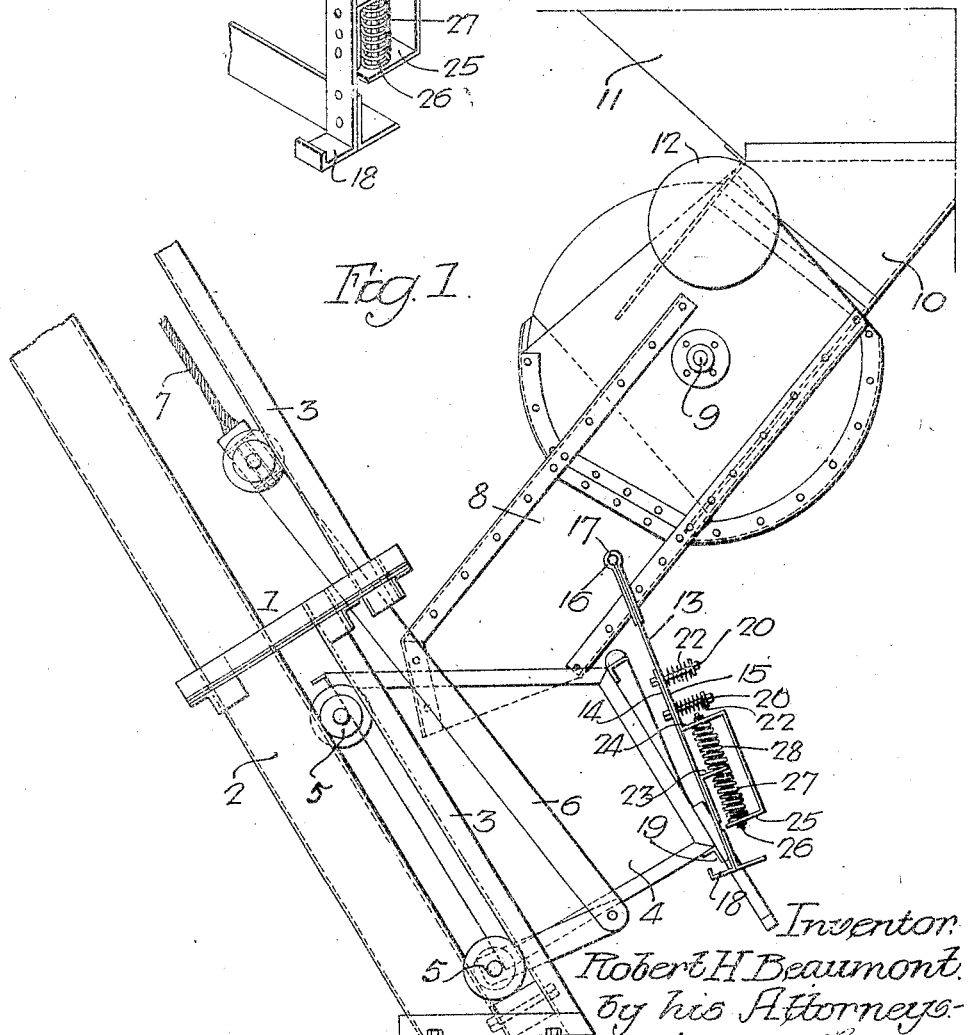

This object I attain in the following manner, reference being had to the accompanying drawings, in which:

Fig. 1 is a side view of sufficient of a skip hoist to illustrate my invention; and Fig. 2 is a perspective view of the hooked bar illustrating my improvement.

1 is the frame of a skip hoist. 2 and 3 are rails. 4 is a bucket having wheels 5, adapted to the rails. 6 is a bail attached to the bucket and to the hoisting rope 7. 8 is a chute pivoted at 9 and, when in the position shown in Fig. 1, is in line with a fixed chute 10 of a hopper 11. 12 is a counterweight for the chute.

When the bucket is in the position shown in Fig. 1, the chute 8 extends over the bucket so as to allow the material to flow from the hopper through the chute into the bucket. When the bucket is filled, the upward movement of the bucket turns the chute on its pivot and the chute acts as a gate to prevent the material flowing from the hopper.

In order to move the chute 8 into position when the bucket is lowered, I provide a hooked bar 13, which is made in two parts 14 and 15. The part 15 has an eye 16 for a pivot pin 17 on the bucket. The part 14 has a hook 18, which is arranged to project under the bucket and to be engaged by a flange 19 on the bucket. In order to allow the hooked bar to yield so as to prevent the sudden striking of the chute 8 against the upper end of the bucket, I frictionally connect the two parts 14 and 15 by bolts 20, which pass through slots 21 in the part 14, in the present instance. On these bolts are springs 22, which tend to hold the two parts in frictional contact. On the part 14 is an angle bracket 23 and the part 15 is bent, as shown, forming two abutments 24 and 25. 26 is a bolt extending through both abutments and on each side of the bracket 23 and bearing against the abutments are springs 27 and 28.

The operation is as follows: When the bucket is lowered, its flange 19 engages the hook 18 of the bar 13 and pulls the chute from an elevated position to a position directly above the upper end of the bucket and in line with the chute 10 of the hopper. When the bucket engages the hooked bar the action compresses the spring 27 and the springs 22 allow the hooked part 14 of the bar to slide on the part 15. This absorbs the shock and permits the chute 8 to assume a position over the bucket with comparatively little jar. The moment the bucket is raised, then the spring 27 expands and the part 14 slides on the part 15, assuming the position shown in Fig. 1. The spring is a balance spring to keep the hook section 14 in proper position.

By the above construction, it will be seen that I provide a yielding connection between the bucket and the chute so as to obviate the hard blows of the chute against the upper edge of the bucket.

I claim:

1. The combination in a skip hoist, of a bucket; a movable chute adapted to extend over the bucket and to discharge material into the bucket; and a yielding hooked bar through which the chute is moved into position by the bucket.

2. The combination in a skip hoist, of means for raising and lowering the bucket; a pivoted chute adapted to be moved into and out of position above the bucket; and a hooked bar pivoted to the chute and arranged to be engaged by the bucket, said bar having a yielding section.

3. The combination in a skip hoist, of a bucket; means for raising and lowering the bucket; a pivoted chute arranged to extend over the bucket and to load the bucket with material flowing through the chute; a hooked bar pivoted to the chute and arranged to be engaged by the bucket; said bar being made in two parts; means for frictionally holding the parts together; and a spring located between the two parts and arranged to be compressed when the bucket engages the hook of the bar.

4. The combination in a skip hoist, of a bucket; means for raising and lowering the bucket; a pivoted chute adapted to be actuated by the bucket, the chute extending over the bucket when the bucket is lowered; a bar pivoted to the chute and arranged to be engaged by the bucket, said bar being made in two parts, one part being slotted and the other part having bolts; springs on the bolts frictionally holding the parts together, one part having a bracket extending between the two abutments on the other part; and springs between the abutments and the bracket.

ROBERT H. BEAUMONT.